Patented May 10, 1938

2,116,665

UNITED STATES PATENT OFFICE 2,116,665

PROCESS OF RECOVERY OF POLYHYDRIC ALCOHOLS

Kenneth R. Brown, Tamaqua, Pa., assignor to Atlas Powder Company, Wilmington, Del., a corporation of Delaware No Drawing. Application September 11, 1936, Serial No. 100,390

9 Claims. (Cl. 195—2)

This application relates to the process of recovering polyhydric alcohols from process liquors obtained by the reduction of sugars, and more particularly to the separation of certain polyhydric alcohols having more than four hydroxyl groups from each other, as well as from certain non-alcoholic constituents of such liquors.

An object of my invention is the recovery of polyhydric alcohols from process liquors resulting from the reduction of the monosaccharides.

Another object of my invention is to accomplish the removal of inorganic salts from the aforementioned process liquors, followed by, if desired, a separation of mannitol or dulcitol.

Still another object of my invention is the separation of isomeric hexahydric alcohols from mixtures containing the same, and more particularly the separation of mannitol from mixtures containing mannitol and sorbitol, dulcitol from mixtures containing dulcitol and sorbitol, and dulcitol and mannitol from mixtures containing dulcitol, mannitol and sorbitol.

Still another object of my invention is to economically treat sugar reduction process liquors so as to obtain commercially valuable products.

Other objects of my invention will be apparent to those skilled in the art as the description of my process proceeds.

My invention may advantageously be utilized for separating certain polyhydric alcohols present in process liquors made by the reduction of the monosaccharides, whether such reduction be accomplished by means of sodium amalgam, electrolysis, or pressure hydrogenation in the presence of a suitable catalyst.

In the reduction of the monosaccharides to the polyhydric alcohols, the reaction is frequently carried on in an alkaline medium, but my invention is applicable to the separation of the alcohols, regardless of whether reduction is carried out in acid, neutral or alkaline media. Usually the reduction is carried out in aqueous solutions but frequently ethyl or methyl alcohols are added in pressure hydrogenation and my invention is applicable to process liquors obtained by either aqueous or alcoholic reduction of sugars.

The mixture of polyhydric alcohols resulting from the reduction of sugars with sodium amalgam may contain free alkali, a mixture of polyhydric alcohols, some unreduced sugar if reduction is incomplete, and small quantities of mercury, sodium amalgam and other impurities.

The mixture of polyhydric alcohols made by electrolytic reduction of sugars contains the electrolyte which may be sodium or potassium sulphate varying in amount up to saturation, and may contain an alkali such as caustic soda varying in amount preferably from 0.1 to 40 grams per liter of solution, the remainder of the solutes in the solution comprising one or more polyhydric alcohols and unreduced sugar if reduction is incomplete.

The mixture of polyhydric alcohols resulting from reduction of sugars at high pressure and temperature in the presence of a suitable catalyst may contain the catalyst, catalyst support, some unreduced sugar if reduction is incomplete, and either small quantities of acid or alkali depending upon whether reduction has been carried out in acid or alkaline solutions, or a small quantity of a neutral salt if reduction has been carried out in neutral solution.

My invention is generally applicable to the purification of such sugar reduction liquors to remove the inorganic salt constituents thereof. If so desired, my invention also provides for the separation, in the course of such purification, of any mannitol and dulcitol which may be present in the liquors. My invention is also generally applicable to the separation of mannitol and dulcitol from liquors comprising mixtures of polyhydroxy alcohols having more than four hydroxyl groups. Non-limiting examples of purification and/or separation which may be performed as embodiments of my invention are as follows:—

1. Treatment of a reduction mixture comprising one or more alcohols having more than four hydroxyl groups to obtain a syrup substantially free from inorganic salts.

2. Treatment of a reduction mixture comprising mannitol and/or dulcitol and at least one other polyhydric alcohol having more than four hydroxyl groups to obtain a syrup substantially free from inorganic salts, and separating from the other constituents of the said syrup any mannitol and dulcitol present.

3. Treatment of a mixture comprising mannitol and/or dulcitol and at least one other polyhydric alcohol having more than four hydroxyl groups to separate any mannitol and dulcitol present from the other constituents of the mixture.

In connection with all of the foregoing embodiments, I may free the polyhydric alcohol or mixture of polyhydric alcohols (which remains after separation of the inorganic salt, and the mannitol and dulcitol) from unreduced sugar by the step of fermenting, if so desired.

It is to be understood that the following description is for the purpose of disclosing a full and complete treatment of process liquors in accordance with my invention which is not to be considered, however, as limited thereby. For example, it will be apparent as the description proceeds that certain purification or separation steps may or may not be carried out, depending upon the necessity or desirability of purifying or separating the particular constituent involved.

Preferably, in proceeding with my process and regardless of the source of the sugar reduction liquor which is to be treated, the liquor is adjusted to a pH of 4.0 to 7.5 by either acid or alkali as may be necessary. If reduction has been carried out in an acetic acid medium, the solution may not be neutralized after reduction as the evaporation hereinafter referred to will remove the acetic acid from the solution of polyhydric alcohols. The solution is then filtered through a filter aid to remove insoluble material, such as a catalyst, catalyst support, or insoluble material of various kinds. If a large quantity of dulcitol is produced in the reduction, some insoluble dulcitol may be removed by this filtration. The filtered solution may be given a treatment with an activated carbon such as "Darco" to reduce its color, if desired.

The solution thus obtained is evaporated, preferably under vacuum and with agitation, to reduce the water content to the desired amount, care being taken to prevent the temperature of the mixture from reaching a point where the organic compounds will be caramelized during the evaporation, particularly toward the end of the evaporation when the total solids are high. The evaporation is continued until the amount of water in the mixture is preferably between 1 and 20%. The amount of water may be estimated by one of the usual analytical methods. It is generally advisable in view of subsequent operations to reduce the water of the mixture to a low percentage, say 2 to 5%, but under certain conditions it may be desired to allow the water content in the mixture to remain above 20%.

When the water in the mixture has reached 1 to 20% of the mixture, there will be some separation of any inorganic salts present, such as, for example, sodium sulphate. Salt may be present, either as the electrolyte when reduction was carried out electrolytically or as the result of alkalizing or acidifying material when reduction was carried out at high pressure and high temperature in the presence of a catalyst, and subsequently neutralized. Some insoluble mannitol or dulcitol may also be present in the evaporated mixture.

When the amount of water is at the prescribed minimum, I add a liquid which is, when hot, predominantly a solvent for the polyhydric alcohols in the mixture, and a non-solvent for inorganic salts, and which when cold is a non-solvent for mannitol and dulcitol and a solvent for the remaining polyhydric bodies. Ethyl or methyl alcohol are suitable non-limiting examples of such liquids. It has been found that dulcitol is soluble and that mannitol, sorbitol, xylitol, other polyhydroxy bodies and sugar are quite soluble in hot ethyl or methyl alcohol, whereas the inorganic salts are practically insoluble in these hot alcohols. It has also been found that mannitol and dulcitol are practically insoluble in alcohol of 85% strength at a temperature of about 10° to 25° C., whereas sorbitol, xylitol, other polyhydroxy bodies and sugar are appreciably soluble in 85% alcohol at such temperature. This latter property of the added liquid is subsequently utilized to effect separation of mannitol and dulcitol as will be hereinafter more fully described.

The liquid is added to the mixture in the evaporator at this stage of the process for the purpose of dissolving the mixture of polyhydric alcohols and other organic compounds present and obtaining substantially complete separation of the inorganic salts. The amount of liquid which it is necessary to add to the mixture may vary between wide limits but in the case of aqueous ethyl alcohol of 85% strength, it is usually from 1 to 10 volumes to each volume of polyhydric alcohol in the mixture. The amount, as well as the strength of the alcohol, may be widely varied, depending upon the amount as well as the solubility and quantity of the polyhydric alcohols in the mixture. It will be obvious that if the evaporation is prolonged until the water content of the mixture is low, a lower strength alcohol may be used advantageously. Conversely, if the removal of water is less complete, it is preferable to employ a higher strength alcohol than that specified. If a polyhydric alcohol having a low ash content is desired, it is advantageous to remove as much water as possible from the mixture by evaporation and to digest the mixture with a relatively large volume of high strength alcohol. For a given volume of polyhydric alcohols of given water content, the volume of alcohol required to effect solution decreases as the strength of the alcohol decreases. Conversely, this volume increases as the strength of the alcohol increases. The volume of alcohol used to dissolve the polyhydric alcohol mixture will vary with the type, thus methyl alcohol can be used in smaller volume than ethyl alcohol of equal strength. On the other hand, the solubility of inorganic salts is less in ethyl alcohol than in methyl alcohol. The salts in the mixture remain insoluble in the alcohols even though the temperature of the mixture of polyhydric alcohols and ethyl or methyl alcohol is maintained at 65° to 80° C.

After the addition of alcohols, the temperature of the mixture is maintained sufficiently high to dissolve at least 85% of the polyhydric alcohol present. Preferably, the mixture is agitated during this maintenance of temperature. The mixture may be heated to 65° to 80° C. to expedite solution. At this temperature the polyhydric alcohols, mannitol, dulcitol, sorbitol, xylitol, other polyhydroxy bodies and sugar go in the solution while the salts remain substantially undissolved. The mixture is then filtered while hot to remove the inorganic salt, the filtration being preferably carried out either through a standard salt box, usually provided in the evaporator, or through suitable filter presses properly heated so that the temperature of the solution does not fall below the point where dissolved mannitol or dulcitol will crystallize.

The above described process effects a much more complete separation of salt from the process liquor than could be obtained by simple evaporation of the liquor. Small quantities of polyhydric alcohols which may be undissolved remain with the salt from which they may be subsequently recovered. Where the process liquor contains dulcitol in quantity it may be necessary to increase the amount of alcohol if it is desired to prevent substantial quantities of dulcitol from separating with the salt, since dulcitol is less soluble in hot alcohol than the other polyhydroxy bodies referred to above. If desired, however, a susbtantial portion of the dulcitol may be permitted to precipitate with the salt, and the mixture of salt and dulcitol so precipitated may be separated and treated with hot alcohol to obtain a solution of dulcitol. It is to be understood, however, that if dulcitol is present in the original process liquor, substantial quantities will remain dissolved therein during the hot alcoholic treatment.

The hot solution of the polyhydric alcohols thus obtained passes directly into a crystallizing tank or kettle where it is allowed to cool while being agitated. When the temperature of the alcoholic solution has fallen to about 60° to 65° C., crystals of mannitol and/or dulcitol may begin to separate from the solution if mannitol and dulcitol or one of them is present in quantity. Since sugar reduction liquors rarely contain both mannitol and dulcitol in quantity, the separation process can be utilized to produce mannitol or dulcitol in substantially pure form as distinguished from mixtures of the two alcohols. Agitation and cooling are continued until a temperature of about 10° to 25° C. is reached. The temperature is maintained at this point for several hours with agitation so as to increase the yield of mannitol or dulcitol crystals. The size of the crystals may be changed at will by modifying the amount of agitation or by controlling the rate of cooling.

The mannitol or dulcitol crystals are then separated from the alcoholic solution of the other polyhydric alcohols by filtration through a filter press, a centrifuge, or any other suitable equipment. If neither manitol nor dulcitol is present in the alcohol solution with the other polyhydric alcohols, the crystallization of the alcoholic solution and the subsequent filtration operations just described need not be carried out.

The mother liquor running off from the mannitol or dulcitol crystals, comprising an alcohol solution of the other polyhydric alcohols, some reducing sugar if reduction was incomplete, and a very small quantity of dissolved salts, is placed into an evaporator and the alcohol completely evaporated, at which time the thick syrup in the kettle consists of polyhydric alcohols, some reducing sugar and small quantities of salts. During evaporation the temperature should not exceed the point where caramelization of the polyhydric alcohol syrup occurs. After complete evaporation of the alcohol, water is added to the kettle, preferably in such quantity that the resulting mixture is a thick syrup, consisting of 15% of water, 0 to 20% of reducing sugar, 0.5 to 2.5% of salts, the balance being polyhydric alcohols. For many technical uses the syrup thus obtained is suitable and it may be run directly into shipping containers.

The finished syrup is eminently suitable for direct use wherever a high grade substantially salt-free syrup of hexahydric or pentahydric alcohols other than mannitol and dulcitol is desired. However, it may be subjected to further treatment to remove small quantities of certain ingredients whose presence is deemed objectionable for certain uses. Thus, the small amount of unreduced sugar present in the syrup may be undesirable in certain applications such as use as a sweetening agent in diabetic foods, or where the syrup might be exposed to conditions favorable to fermentation of this sugar. The color of the finished syrup may be deemed too dark for certain purposes. This color may be due to exposure of the polyhydric alcohol mixture during its processing or during storage in contact with certain metals. Thus polyhydric alcohol mixtures of the type with which this application is concerned are peculiarly liable to discoloration by metallic copper and copper bearing alloys.

To remove the unreduced sugar from the syrup, I dilute the syrup with water so as to form a 30 to 50% solution, add a small quantity of yeast to the diluted syrup and allow the mixture to ferment at 25 to 35° C. until the amount of sugar is reduced to the desired amount, usually 1% or less. I then filter and evaporate until a syrup containing 15% of water is again obtained.

To remove the color of the syrup I may agitate it with an activated carbon such as "Darco" G—60 at a temperature of 60°–75° C. and then filter to remove the carbon. However, such a treatment will not be sufficient to remove the copper discoloration referred to above. To remove this, the syrup is treated with a small amount, for example .1 to 2%, of caustic soda at a temperature of 60° to 75° C., then agitated with activated carbon and filtered. Or I may utilize mercaptobenzothiazole in an amount equal to five times the weight of the copper to remove the copper by adding this amount of mercaptobenzothiazole to the hot concentrated syrup, agitating with activated carbon and filtering.

The mannitol separated out as above may be further purified by recrystallization from hot water, if desired. Dulcitol may be further purified in a similar manner.

Below I have described in detail several specific embodiments of my invention. However, these are not to be taken as limiting the scope of my invention which I desire to be limited only as set forth in the appended claims. In the examples, the concentration of ethyl or methyl alcohol specified is percentage by volume. The process liquors referred to as being obtained by electrolytic reduction were prepared in the manner disclosed in U. S. Patent to Creighton No. 1,990,582. Where denatured ethyl alcohol is referred to, specially denatured alcohol known as Formula No. 1 is meant.

*Example 1.*—6.7 liters of a process liquor obtained by the electrolytic reduction of glucose under conditions of low alkalinity and containing considerable sorbitol and substantially no mannitol were made substantially neutral and were evaporated under vacuum to remove water. 5.74 liters of 81½% denatured ethyl alcohol were added to the evaporated mixture and the resulting mixture heated to 75° C. The inorganic salts were substantially undissolved while the polyhydric alcohol portion went into solution. The mixture was filtered while hot to remove these salts. The filtrate was evaporated under vacuum to remove water and ethyl alcohol, yielding a thick syrup consisting largely of polyhydric alcohols and some sugar.

To obtain a syrup free from sugar, water was added until a solution containing 50% solids was obtained. This was fermented with yeast for two days at 27° C. whereby the sugar content was lowered from an initial value of 29.9 to 1.0 gms. per liter. 1% of activated carbon on weight of the total solids was added to the fermented liquor and the mixture filtered. The filtrate was evaporated under vacuum to yield 2066 grams of a light yellow syrup consisting largely of sorbitol and containing 12.4% water.

*Example 2.*—To 100 liters of process liquor obtained by the electrolytic reduction of glucose and containing considerable mannitol and sorbitol, there were added 285 grams of yeast, whereupon the mixture was allowed to ferment. The fermented mixture was filtered and the filtrate was evaporated under vacuum. 64.7 liters of 87% methyl alcohol were added and the mixture was heated to 70° C. with agitation. The inorganic salts (7.3 kgs.) were filtered from the hot solution. The remaining solution was cooled to 12° C. with intermittent agitation whereupon 5.0 kgs. of mannitol crystallized out and were removed by filtration. The filtrate was evaporated to remove alcohol and yielded 25.9 kgs. of a syrup comprising largely sorbitol.

*Example 3.*—In this example, the procedure is the same as in Example 2 except that in place of the methyl alcohol therein specified there is used 60 liters of 81½% denatured ethyl alcohol and the mixture was heated to 75° C. The salt (7.5 kgs.) was filtered off and the filtrate cooled with intermittent agitation to 12° C. whereupon 5.75 kgs. of mannitol crystallized out and were removed. The remaining solution was evaporated as in Example 2, and yielded 24.4 kgs. of a polyhydric alcohol syrup comprising largely sorbitol.

*Example 4.*—100 liters of a process liquor obtained by reduction of invert sugar under conditions of low alkalinity and containing mannitol and sorbitol were subjected to fermentation as in Example 2 until the reducing sugar was reduced from 23.9 to 1.0 grams per liter. The mixture was then filtered and the filtrate evaporated under vacuum as in Example 2. 24.9 liters of 91½% denatured ethyl alcohol were added and the mixture was digested at 75° C. whereupon the salt (7.0 kgs.) was filtered off. The filtrate was cooled with occasional agitation to 12° C. whereupon 4.7 kgs. of mannitol crystallized out and were removed by filtration. The filtrate was evaporated under vacuum to yield the resulting polyhydric alcohol syrup weighing 20.9 kgs. and containing 12.2% moisture, 0.9% ash, 0.2% reducing sugar, the balance being polyhydric alcohols and comprising sorbitol.

*Example 5.*—100 liters of an aqueous process liquor obtained by the electrolytic reduction of invert sugar under conditions of high alkalinity and containing mannitol and sorbitol were adjusted to a pH of 5.3 with sulfuric acid. The mixture was then evaporated under vacuum as in Example 1. There were then added 36.6 liters of 70% denatured ethyl alcohol and the mixture was heated to 75° C. with agitation. The mixture was filtered while hot to remove 13.6 kgs. of salt. The filtrate was cooled to 12° C. causing 7.4 kgs. of mannitol to crystallize out. The remaining solution after removal of the mannitol was thereupon evaporated under vacuum yielding 22.0 kgs. of a syrup containing 12.0% moisture, 5.5% ash, 12.7% reducing sugar, the balance being polyhydric alcohols and comprising sorbitol.

*Example 6.*—1 liter of a process liquor obtained by the electrolytic reduction of mannose and containing sorbitol and mannitol was neutralized with sulfuric acid to a pH of 5.3 and evaporated under vacuum as in Example 1. There were then added 1.1 liters of U. S. P. 81½% ethyl alcohol. The mixture was heated to 75° C. with agitation and then filtered, removing 139 gms. of salt. The filtrate was cooled to 12° C. 89 gms. of mannitol crystallized out and were filtered off. The filtrate was evaporated under vacuum to give a syrup weighing 108 gms. and comprising sorbitol.

*Example 7.*—17 liters of a process liquor obtained by the electrolytic reduction of invert sugar under conditions of high alkalinity and containing sorbitol and mannitol with potassium sulfate as the electrolyte were adjusted to a pH of 6.4 with sulfuric acid and evaporated as in Example 1. 21.7 liters of 81½% ethyl alcohol were added and the mixture heated to 75° C. whereupon 1.1 kgms. of salt were separated by filtration. The filtrate was cooled to 12° C. and 2.6 kgs. of mannitol separated out. The remaining solution was evaporated under vacuum to yield 6.3 kgs. of a polyhydric alcohol syrup.

*Example 8.*—120 liters of a process liquor obtained by the electrolytic reduction of hydrolyzed lactose under conditions of low alkalinity and containing dulcitol and sorbitol are brought to a pH of 5.3 by sulfuric acid. 5.2 kgs. of insoluble dulcitol which was suspended in the initial process liquor were removed by filtration and washed with water, the wash water being added to the filtrate.

The combined filtrate and wash water were evaporated as in Example 1. 30 liters of 81½% denatured ethyl alcohol were added to the mixture which was then heated to 70° C. and allowed to stand until the salt settled from the solution containing some suspended dulcitol, which was decanted from the salt. The salt was washed with 11.4 liters of 81½% ethyl alcohol and was then digested with 10 liters of 50% ethyl alcohol at 75° C., followed by filtration while hot, yielding 6.65 kgs. of salt substantially free from dulcitol. The filtrate was evaporated to remove the alcohol yielding 0.64 kg. crude dulcitol containing 0.13 kg. of salt.

The solution containing suspended dulcitol decanted as above was filtered to remove the suspended dulcitol which was washed first with the wash liquor obtained as above from washing the settled salt and then with 1.5 liters of 81½% ethyl alcohol, yielding 2.1 kgs. of dulcitol.

The alcoholic filtrate and the wash liquor just referred to were combined and cooled to 10° C. whereupon .56 kgs. of dulcitol crystallized out and were removed by filtration. This filtrate was evaporated to remove the alcohol and yielded 23.5 kgs. of a polyhydric alcohol syrup containing considerable sorbitol.

The dulcitol recovered in the several steps above was purified further by recrystallization from hot water and thus purified weighed 6.1 kgs.

*Example 9.*—1.4 liters of a process liquor obtained by the electrolytic reduction of xylose and containing considerable xylitol were neutralized with $H_2SO_4$. The solution was concentrated to a volume of 300 c. c. by evaporation under vacuum. 1.5 liters of 93% ethyl alcohol were added to the mixture which was then heated and filtered to remove the salt. The alcoholic filtrate was cooled to room temperature. No crystalline product separated out. The ethyl alcohol was removed by vacuum distillation yielding 172 gms. of a polyhydric alcohol syrup containing considerable xylitol.

*Example 10.*—This example shows how my invention may be applied to mixtures of polyhydric alcohols obtained by pressure hydrogenation of reducing sugars. This example concerns recovery of mannitol from a mixture comprising mannitol and sorbitol produced by such a method.

60 gms. of invert sugar, 105 gms. of water and 7.5 gms. of reduced nickel oxide catalyst were maintained at 150° C. for 1½ hours with hydrogen under a pressure of 1925 to 2360 lbs. per sq. inch. All of the sugar was reduced. After cooling, the mixture was filtered to remove insoluble matter and was then evaporated under vacuum as in Example 1. 390 c. c. of 81½% denatured ethyl alcohol were added and the mixture was heated to 70° C. A small quantity of insoluble material was filtered from the alcohol solution which was then cooled to 12° C., whereupon 11 gms. of mannitol crystallized out. The mannitol was separated by filtration and the filtrate was distilled under vacuum to remove the alcohol, yielding 60 gms. of a polyhydric alcohol syrup consisting largely of sorbitol.

*Example 11.*—In this example a low-ash syrup was produced by use of absolute ethyl alcohol, and mannitol was not separated. 9 liters of a process liquor obtained by the electrolytic reduction of glucose while the alkalinity was maintained between 10 and 20 gms. NaOH per liter were adjusted to a pH of 5.3 and evaporated under vacuum to a moisture content of 4%. The evaporated mixture was mixed with 6 liters of absolute ethyl alcohol and heated to 78° C. The insoluble material which consisted chiefly of sodium sulfate was filtered from the hot solution. The alcoholic filtrate was evaporated under vacuum to yield a thick fudge-like syrup containing 0.06% sodium sulfate, 8.5% moisture, 8.2% reducing sugar and considerable sorbitol and mannitol together with other polyhydric bodies.

*Example 12.*—In this example, mannitol and sorbitol were recovered from a process liquor produced by the reduction of 99% of glucose.

3.36 liters of an aqueous solution containing 1.09 kgs. of glucose, 225 grams of sodium sulfate and 34 gms. of NaOH were subjected to electrolytic reduction while maintaining the alkalinity between 10 and 20 gms. NaOH per liter until 99% of the glucose was reduced, yielding sorbitol and mannitol. The solution thus obtained was adjusted to a pH of 5.3 with sulfuric acid and evaporated under vacuum of 28½ of Hg and at a temperature of not over 65° C., until no more water came over. Then 3.1 liters of 81½% denatured ethyl alcohol were added and the mixture was heated to 75° C. The hot solution was filtered to remove the inorganic salts. The filtrate was cooled to 20° C. with intermittent agitation, whereupon 91 gms. of mannitol crystallized out and were removed by filtration. This filtrate was evaporated under vacuum yielding 1015 gms. of a polyhydric alcohol syrup containing sorbitol and less than 1.3% of sugar.

*Example 13.*—In this example, mannitol is separated from a process liquor containing mannitol and sorbitol, and unreduced sugar is removed after separation of the mannitol. 3.36 liters of a process liquor containing sorbitol and mannitol, obtained by electrolytic reduction of glucose while maintaining an alkalinity between 10 and 20 gms. NaOH per liter were adjusted to a pH of 5.3 and evaporated under vacuum until no more water came over. Then 3.1 liters of 81½% denatured ethyl alcohol were added and the mixture heated to 75° C. The inorganic salts were then filtered off and the filtrate was cooled to 20° C. causing crystallization of 81 gms. of mannitol which was filtered off. This filtrate was evaporated under vacuum to remove the ethyl alcohol. The residual syrup was diluted with water to a total solids content of 50%, and fermented with 24 gms. of yeast at 30° C. for 3 days. The fermented liquor was agitated with 1% of activated carbon for ½ hour at 70° C. and filtered. The filtrate was evaporated under vacuum to remove most of the water and yielded 958 grams of polyhydric alcohol syrup containing a large amount of sorbitol and only a trace of sugar.

*Example 14.*—In this example, 3.36 liters of a process liquor containing a large amount of sorbitol and substantially no mannitol or dulcitol and obtained by electrolytic reduction of glucose under conditions of low alkalinity until 99% of the sugar was reduced, were adjusted in pH to 5.3 with $H_2SO_4$. The solution was then evaporated under vacuum until no more water came over. Then 3.1 liters of 81½% denatured alcohol were added and the mixture was heated to 75° C. followed by filtration to remove inorganic salts. The filtrate was evaporated under vacuum to remove the ethyl alcohol and yielded a polyhydric alcohol syrup containing sorbitol and less than 1.3% sugar.

It will be understood that numerous variations from this description are within the spirit of my invention. Thus I may vary the temperature and proportions specified within wide limits, or I may omit certain of the steps described, such as for example, filtration of salt where salt is not present in objectionable quantities, or I may omit the various decolorizing treatments set forth. If an alcoholic solution is suitable for certain uses, I may omit the evaporation of the filtrate obtained by filtering off the mannitol or dulcitol. I may, as above pointed out, omit the fermentation of the unreduced sugar in the product. These, and other modifications readily apparent to those skilled in the art, are all within the spirit of my invention.

Having described my invention, I claim:—

1. The process of separating the constituents of liquor obtained by the reduction of sugars and containing at least one polyhydric alcohol having more than four hydroxyl groups which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve at least 85% of the polyhydric alcohol present, removing from the hot mixture any undissolved constituents composed principally of inorganic salt, directly cooling the remaining solution to effect selective separation of any hexahydric alcohol selected from the group consisting of mannitol and dulcitol and removing from the mixture any hexahydric alcohol so separated.

2. The process of separating the constituents of liquor obtained by the reduction of sugar and containing a hexahydric alcohol selected from the group consisting of mannitol and dulcitol, and at least one other polyhydric alcohol having more than four hydroxyl groups which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve at least 85% of the polyhydric alcohols present, removing from the hot mixture any undissolved constituents composed principally of inorganic salt, directly cooling the remaining solution to effect selective separation of hexahydric alcohol selected from the group consisting of mannitol and dulcitol, and removing from the mixture the hexahydric alcohol so separated.

3. The process of separating the constituents of liquor obtained by the reduction of sugar and containing a hexahydric alcohol selected from the group consisting of mannitol and dulcitol, and at least one other polyhydric alcohol having more than four hydroxyl groups which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve at least 85% of the polyhydric alcohols present, removing from the hot mixture any undissolved constituents composed principally of inorganic salt, directly cooling the remaining solution to effect selective separation of hexahydric alcohol selected from the group consisting of mannitol and dulcitol, removing from the mixture the hexahydric alcohol so separated, evaporating the remaining solution to substantially remove the said monohydric alcohol, diluting the resulting mixture with water, and fermenting this solution until the reducing sugar present is substantially lower.

4. The process of separating the constituents of liquor obtained by the reduction of sugar and containing a hexahydric alcohol selected from the group consisting of mannitol and dulcitol, and at least one other polyhydric alcohol having more than four hydroxyl groups which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve at least 85% of the polyhydric alcohols present, removing from the hot mixture any undissolved constituents composed principally of inorganic salt, directly cooling the remaining solution to effect selective separation of hexahydric alcohol selected from the group consisting of mannitol and dulcitol, removing from the mixture the hexahydric alcohol so separated, evaporating the remaining solution to substantially remove the said monohydric alcohol, adding water to the resulting mixture in such quantity as to form a thick syrup containing about 15% of water, and treating this syrup with activated carbon to diminish the color present therein.

5. The process of separating the constituents of liquor obtained by the reduction of sugar and containing a hexahydric alcohol selected from the group consisting of mannitol and dulcitol, and at least one other polyhydric alcohol having more than four hydroxyl groups which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve at least 85% of the polyhydric alcohols present, removing from the hot mixture any undissolved constituents composed principally of inorganic salt, directly cooling the remaining solution to effect selective separation of hexahydric alcohol selected from the group consisting of mannitol and dulcitol, removing from the mixture the hexahydric alcohol so separated, evaporating the remaining solution to substantially remove the said monohydric alcohol, adding water to the resulting mixture in such quantity as to form a thick syrup containing about 15% of water, and removing copper discoloration from this syrup by heating it with 0.1% to 2% of caustic soda, then agitating it with activated carbon and filtering.

6. The process of separating the constituents of liquor obtained by the reduction of sugar and containing a hexahydric alcohol selected from the group consisting of mannitol and dulcitol, and at least one other polyhydric alcohol having more than four hydroxyl groups which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve at least 85% of the polyhydric alcohols present, removing from the hot mixture any undissolved constituents composed principally of inorganic salt, directly cooling the remaining solution to effect selective separation of hexahydric alcohol selected from the group consisting of mannitol and dulcitol, removing from the mixture the hexahydric alcohol so separated, evaporating the remaining solution to substantially remove the said monohydric alcohol, removing copper discoloration from this syrup by adding thereto an amount of mercaptobenzothiazole equal to at least five times the weight of soluble copper, agitating, adding activated carbon, continuing agitation and filtering.

7. The process of removing inorganic salts from liquors obtained by the reduction of sugars and containing at least one polyhydric alcohol having more than four hydroxyl groups and at least one inorganic salt which comprises concentrating the liquor by evaporation under vacuum until it has a water content of from 1% to 20%, adding to the concentrated liquor a monohydric alcohol selected from the group consisting of ethyl and methyl alcohol, maintaining the resulting mixture at a temperature sufficient to dissolve at least 85% of the polyhydric alcohols present while precipitating substantially all of the inorganic salts, and separating the solution from the inorganic salts.

8. The process of separating the constituents of liquor obtained by the reduction of sugars and containing mannitol and sorbitol which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve substantially all of the polyhydric alcohols present, removing from the hot mixture any undissolved inorganic salt, directly cooling the remaining solution to effect selective separation of the mannitol, and removing the mannitol so separated from the mixture.

9. The process of separating the constituents of liquor obtained by the reduction of sugar and containing mannitol, sorbitol and sodium sulphate which comprises concentrating the liquor by evaporation under vacuum until it has a water content of from 1% to 20%, adding to the concentrated liquor a monohydric alcohol selected from the group consisting of ethyl and methyl alcohols, maintaining the resulting mixture at a temperature sufficient to dissolve substantially all of the polyhydric alcohols present, directly cooling the remaining solution to effect selective separation of the mannitol, and removing the mannitol so separated from the mixture.

KENNETH R. BROWN.

CERTIFICATE OF CORRECTION.

Patent No. 2,116,665. May 10, 1938.

KENNETH R. BROWN.

It is hereby certified that error appears in the printed specification of the above numbered patent requiring correction as follows: Page 5, first column, line 41, Example 12., for "of $28\frac{1}{2}$ of Hg" read of $28\frac{1}{2}"$ of Hg; and that the said Letters Patent should be read with this correction therein that the same may conform to the record of the case in the Patent Office.

Signed and sealed this 14th day of June. A. D. 1938.

(Seal)

Henry Van Arsdale,
Acting Commissioner of Patents.